(12) United States Patent
Takemoto et al.

(10) Patent No.: US 8,681,430 B2
(45) Date of Patent: Mar. 25, 2014

(54) ADAPTER OPTICAL SYSTEM AND IMAGE PICKUP APPARATUS INCLUDING THE SAME

(75) Inventors: Shoichi Takemoto, Utsunomiya (JP); Yutaka Iriyama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 111 days.

(21) Appl. No.: 13/469,290

(22) Filed: May 11, 2012

(65) Prior Publication Data

US 2012/0300117 A1    Nov. 29, 2012

(30) Foreign Application Priority Data

May 24, 2011  (JP) .................................. 2011-115721

(51) Int. Cl.
*G02B 15/02* (2006.01)
*G02B 15/10* (2006.01)

(52) U.S. Cl.
CPC ........................................ *G02B 15/10* (2013.01)
USPC .......................................... 359/672; 359/675

(58) Field of Classification Search
USPC .................................. 359/672–675
See application file for complete search history.

(56) References Cited

U.S. PATENT DOCUMENTS

2012/0019924 A1*    1/2012   Shimomura .................. 359/672

FOREIGN PATENT DOCUMENTS

| JP | 6325612 A | 11/1994 |
| JP | 3861241 B2 | 12/2006 |

* cited by examiner

*Primary Examiner* — William Choi
(74) *Attorney, Agent, or Firm* — Rossi, Kimms & McDowell LLP

(57) ABSTRACT

Provided is an adapter optical system attachable between an image pickup lens and a camera body, the adapter optical system including, in order from an object side: a first optical unit having negative refractive power; a second optical unit that is insertable in and removable from an optical path; and a third optical unit having positive refractive power, in which the following expression is satisfied: $0.03<|\alpha a2|<0.50$, where $\alpha a2$ represents an incident converted inclination angle obtained by normalizing an incident inclination angle of an axial beam entering the second optical unit inserted in an optical path with an exit inclination angle of an axial paraxial ray emerging from a surface closest to an image plane side in the adapter optical system being set to one (1).

10 Claims, 7 Drawing Sheets

ADAPTER OPTICAL SYSTEM AND IMAGE PICKUP APPARATUS INCLUDING THE SAME

BACKGROUND OF THE INVENTION

1. Field of the Invention

The present invention relates to an adapter optical system to be attached to an image side of an image pickup lens used for a television camera, a digital still camera, a video camera, or the like in a detachable manner, the adapter optical system including an optical element that can be inserted in and removed from an optical path, and also relates to an image pickup apparatus including the adapter optical system.

2. Description of the Related Art

Conventionally, there are known many optical characteristic converting element (hereinafter, also referred to as simply "optical element") to be disposed in the optical path so as to change optical characteristic. Embodiments of such optical element include a neutral density filter (ND filter) and a color temperature conversion filter. The optical characteristic converting element is not necessary in a situation where there is no need to change the optical characteristic, and hence the optical characteristic converting element must be removed from the optical path. When the optical element is inserted in and removed from the optical path, the thickness of the element may cause a change of an imaging position due to the insertion and removal. As a result, there is a practical problem that an image becomes blurred. To address this problem, there is proposed a technology for suppressing a change of the imaging position when the optical element is inserted and removed. For example, Japanese Patent Application Laid-Open No. S63-25612 discloses an invention of giving refractive power to an optical element to be inserted in order to correct a change of an imaging position when the optical element is inserted. When a parallel flat plate optical element is inserted between an image pickup lens and an image pickup surface, or in a lens system of the image pickup lens, the imaging position is shifted to the over side (namely, the opposite side to the object side). In Japanese Patent Application Laid-Open No. S63-25612, positive refractive power is given to the optical element to be inserted so that the movement of the imaging position is canceled. Japanese Patent No. 3861241 discloses that a change of the imaging position due to switching among a plurality of filters is canceled by moving the image pickup element in the optical axis direction.

However, in the conventional technologies described in Japanese Patent Application Laid-Open No. 563-25612 and Japanese Patent No. 3861241 which are described above, insertion and removal of the optical element causes a change in aberration. For instance, if refractive power is given to the optical element to be inserted so as to cancel the shift of the imaging position as described in Japanese Patent Application Laid-Open No. S63-25612, spherical aberration of the under side occurs when the optical element is inserted. FIG. 9 illustrates a schematic diagram of the spherical aberration when the shift of the imaging position is canceled as described in Japanese Patent Application Laid-Open No. S63-25612. In FIG. 9, a dashed dotted line 902 indicates aberration when the optical element is not inserted in the optical path, a broken line 901 indicates aberration when the optical element is inserted in the optical path, and a position 907 indicates a position of an image pickup surface. As illustrated in FIG. 9, quality of the obtained image is deteriorated, and in addition, spherical aberration is changed from the state indicated by the line 902 to the state indicated by the line 901. When a best focus position (903, 904) expressed as a position where a root-mean-square (RMS) deviation of a spot diameter of an axial beam in a spot diagram becomes smallest exceeds a focal depth (range between 905 and 906), an influence of the insertion and removal of the optical element to the image becomes conspicuous, and hence the obtained image is changed significantly.

Further, if a function of inserting and removing the optical characteristic converting element is added to an existing product, it is preferred that the insertion and removal of the optical characteristic converting element be performed readily and in short time as much as possible. However, with the above-mentioned technology disclosed in Japanese Patent Application Laid-Open No. S63-25612, a space is formed between the image pickup lens and an imaging surface, and hence it is necessary to redesign the image pickup lens itself. Also with the technology disclosed in Japanese Patent No. 3861241, it is necessary to additionally dispose a mechanism for driving the image pickup element.

SUMMARY OF THE INVENTION

The present invention provides an adapter optical system including an optical element that can be inserted in and removed from an optical path, which is capable of suppressing a change of an imaging position due to insertion and removal of the optical element having a thickness, and to provide an image pickup apparatus including the adapter optical system.

An exemplary embodiment of the present invention provides an adapter optical system attachable between an image pickup lens and a camera body, the adapter optical system including, in order from an object side: a first optical unit having negative refractive power; a second optical unit that is insertable in and removable from an optical path; and a third optical unit having positive refractive power. Further, the following expression is satisfied: $0.03<|\alpha a2|<0.50$, where $\alpha a2$ represents an incident converted inclination angle obtained by normalizing an incident inclination angle of an axial beam entering the second optical unit inserted in an optical path with an exit inclination angle of an axial paraxial ray emerging from a surface closest to an image plane side in the adapter optical system being set to one (1).

According to the present invention, it is possible to provide the adapter optical system including the optical element that can be inserted in and removed from the optical path, which is capable of suppressing a change of the imaging position due to insertion and removal of the optical element having a thickness, and to provide the image pickup apparatus including the adapter optical system.

Further features of the present invention will become apparent from the following description of exemplary embodiments with reference to the attached drawings.

DESCRIPTION OF THE EMBODIMENTS

Hereinafter, an exemplary embodiment of the present invention is described in detail with reference to the attached drawings.

Figure 1:
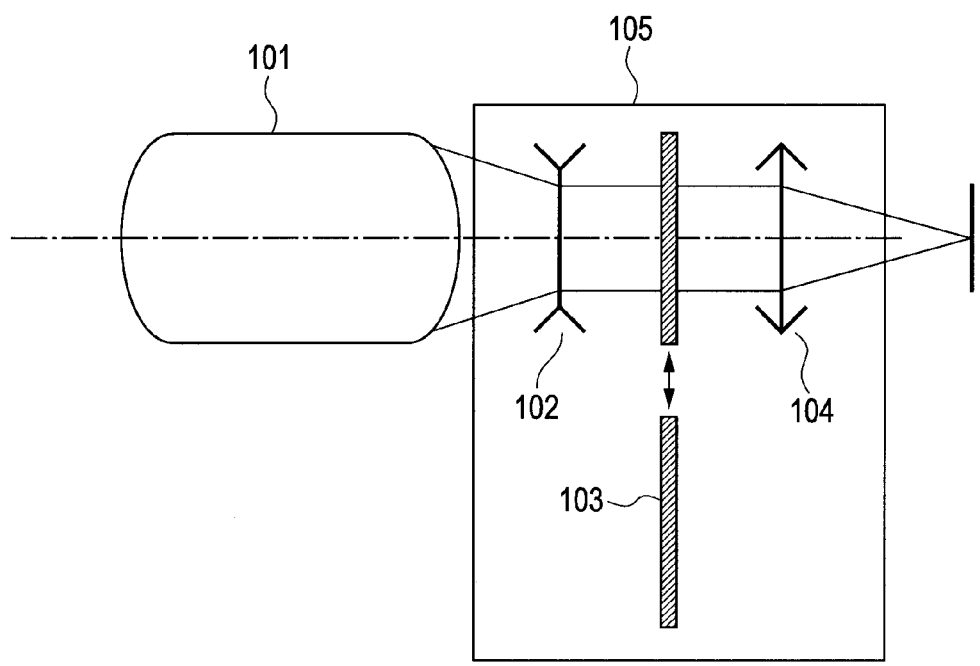
FIG. 1 is a schematic diagram of an optical system structure according to an exemplary embodiment the present invention.

FIG. 1 is a schematic diagram of an optical system structure according to the exemplary embodiment of the present invention. The optical system of FIG. 1 includes an image pickup lens 101 and an adapter optical system 105. The adapter optical system 105 includes a first optical unit 102 having negative refractive power including one or more lenses, a second optical unit 103 including an optical element that can be inserted and removed, which is an optical characteristic converting element such as a neutral density filter (ND filter), a color temperature conversion filter, or a cross screen filter, and a third optical unit 104 having positive refractive power including one or more lenses. In the present invention, a converted inclination angle of an axial beam emerging from the first optical unit 102 is set to an appropriate value so that a change of the imaging position due to insertion and removal of the optical element 103 is suppressed even if the optical element 103 to be inserted and removed has a thickness. Note that, the axial beam and an axial paraxial ray mean an axial beam that passes a paraxial image point.

Figure 8A:
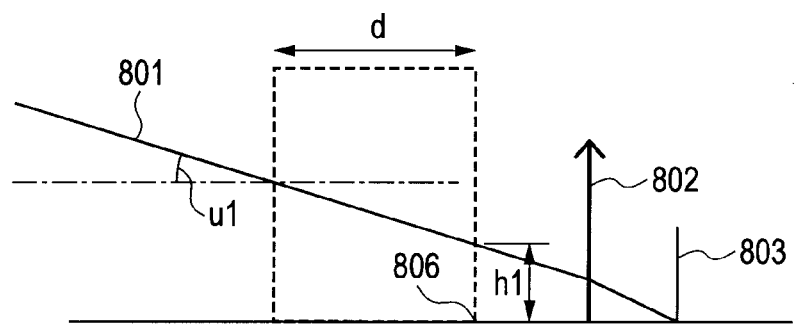
FIG. 8A is a schematic diagram illustrating, when parallel flat plates are inserted in and removed from an optical path, how a beam travels in a case where the parallel flat plates are removed from the optical path.
Figure 8B:
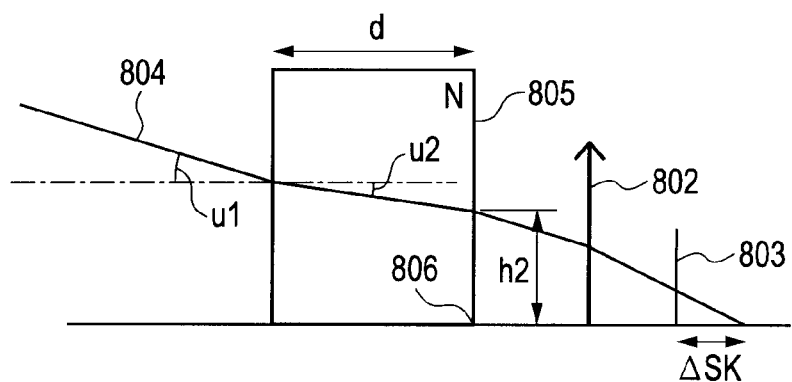
FIG. 8B is a schematic diagram illustrating, when the parallel flat plates are inserted in and removed from the optical path, how a beam travels in a case where the parallel flat plates are inserted in the optical path.
Figure 9:
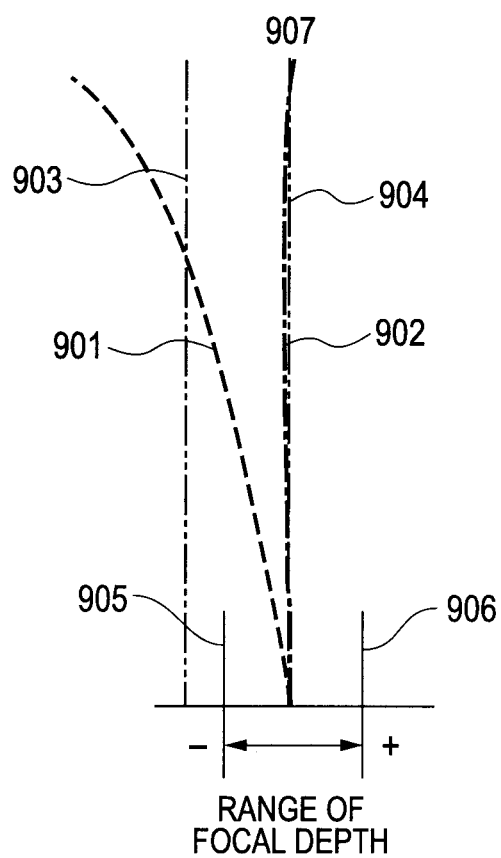
FIG. 9 is a schematic diagram of longitudinal aberration in a conventional example.

Here, referring to FIGS. 8A and 8B, a change of the imaging position in a case where an optical element having a thickness d is inserted in and removed from the optical path is described, supposing that the optical element corresponds to parallel flat plates for simple description. FIG. 8A illustrates an optical path of a beam 801 in a state in which the parallel flat plates are removed from the optical path. The optical system of FIGS. 8A and 8B further includes a positive third optical unit 802 and an imaging surface 803. As illustrated in FIG. 8A, the imaging position and the imaging surface are the same in the state in which the parallel flat plates are removed from the optical path. FIG. 8B illustrates an optical path of a beam 804 in a state in which the parallel flat plates are inserted in the optical path. As illustrated in FIG. 8B, if the parallel flat plates are inserted in the optical path, the beam 804 passes through a plane 806 of FIGS. 8A and 8B at a beam height different from that of the beam 801 doe to the refraction.

Here, an incident angle of the beam entering parallel flat plates 805 is represented by $u1$, a refraction angle of the beam entering the parallel flat plates 805 is represented by $u2$, and a refractive index of a material of the parallel flat plates is represented by N. Then, a relationship between the incident angle $u1$ and the refraction angle $u2$ is expressed by the following Equation (a) based on a paraxial theory.

$$u2 = u1/N \tag{a}$$

As illustrated in FIGS. 8A and 8B, when the beam passes through the parallel flat plates, a beam height of the beam passing through the image side plane 806 of the parallel flat plates is represented by $h2$, a beam height at the same position when the beam does not pass through the parallel flat plates is represented by $h1$. Then, a change of the beam height of the beam at the emerging position is expressed by the following Equation (b).

$$h2 - h1 = d \times u1 \times (1 - 1/N) \tag{b}$$

As expressed by the Equation (b) given above, when the beam height of the beam emerging from the parallel flat plates is changed due to insertion and removal of the parallel flat plates, a beam height of the beam entering the third optical unit 802 having positive refractive power disposed on the image plane side of the parallel flat plates is changed. As a result, the imaging position is changed. In other words, as the thickness d of the element to be inserted and removed is larger, as the refractive index of the material of the element is higher, and further as the incident angle of the beam entering the element is larger, a variation amount ΔSK of the imaging position due to insertion and removal of the element becomes larger. In view of the above, in the present invention, the optical system is devised so that a change of the imaging position satisfies image quality in a level for high definition television (HDTV) when an element having a thickness of approximately 1 to 30 mm made of a material having a refractive index of approximately 1.5 to 2.0 is inserted and removed.

Specifically, in the present invention, the following expression (1) is satisfied:

$$0.03 < |\alpha a2| < 0.50 \tag{1}$$

where $\alpha a2$ represents an incident converted inclination angle of the axial beam entering the second optical unit of the adapter optical system.

If the condition for the upper limit of the expression (1) is not satisfied, a variation amount of the imaging position due to the change in the thickness of the optical characteristic converting element constituting the second optical unit becomes large, and hence the imaging position is changed with respect to the image pickup surface inappropriately by insertion and removal of the element. On the other hand, if the condition for the lower limit is not satisfied, the light reflected by the image sensor passes through the third optical unit and is reflected by the second optical unit so that ghost light is generated and is condensed on the image sensor, and hence the intensity is increased. Here, an incident inclination angle of the axial beam entering the second optical unit refers to an inclination angle (incident converted inclination angle) obtained by normalizing the inclination angle of the axial paraxial ray entering the second optical unit with the inclination angle of the axial paraxial ray emerging from the final plane of the adapter optical system (the plane closest to the image plane side) being set to 1.

The adapter optical system of the present invention includes, in order from an object side, a first optical unit having negative refractive power, a second optical unit including an optical element that can be inserted and removed, and a third optical unit having positive refractive power. It is preferred to satisfy the following expression (2):

$$1.05<|\phi a1/\phi a3|<1.35 \quad (2)$$

where $\phi a1$ represents power of the first optical unit, and $\phi a3$ represents power of the third optical unit.

If the condition for the upper limit of the expression (2) is not satisfied, power of the negative lens unit becomes too strong. Therefore, a beam height of an off-axis beam entering the third optical unit becomes high so that a lens diameter of the third optical unit becomes large. As a result, the adapter optical system becomes large. On the other hand, if the condition for the lower limit is not satisfied, it becomes difficult to secure a necessary back focus.

In addition, it is preferred that the following expression (3) be satisfied:

$$1.05<\beta a<1.50 \quad (3)$$

where $\beta a$ represents an imaging magnification of the entire adapter optical system of the present invention.

If the condition for the upper limit of the expression (3) is not satisfied, the focal length becomes much longer when the adapter optical system is attached to the image pickup lens. Therefore, various aberrations such as spherical aberration and field curvature increase at a telephoto end, and hence image quality is deteriorated. On the other hand, if the condition for the lower limit is not satisfied, the distance to the exit pupil is shortened when the back focus is secured. Then, if the camera optical system includes a color separating optical system separating a light flux from the image pickup lens into three color light fluxes, white shading is generated due to angle characteristics of a dichroic film. In addition, also in an image pickup apparatus (a camera body) having a single image pickup element without the color separating optical system, peripheral light intensity is dropped due to a relationship between a micro lens and a light receiving portion on the image pickup element.

Further, refractive power may be provided to the optical element constituting the second optical unit of the adapter optical system of the present invention. When the refractive power is provided to the optical element, a change of the imaging position to an over side due to insertion and removal of the optical element is canceled, and a change of the imaging position due to the insertion and removal is corrected. Thus, deterioration of image quality can be further suppressed. It is preferred to satisfy the following expression (4):

$$|\phi a1/\phi a2|>100 \quad (4)$$

where $\phi a2$ represents power of the optical element (power of the second optical unit).

If the expression (4) is not satisfied, power of the optical element becomes too strong. Therefore, an influence to an aberration generated by giving a curvature to the optical element becomes so large that image quality is changed due to insertion and removal of the optical element.

In addition, it is preferred that the adapter optical system of the present invention be attached between the image pickup lens and a camera apparatus in a detachable manner and that information be communicated to/from the attached image pickup lens or camera apparatus. By receiving image pickup condition information defining photographing conditions such as focal length information, focus information, aperture stop information, and exit pupil information from the image pickup lens, it is possible to convert optical characteristic depending on a scene to be shot. For instance, when a variable transmittance element including liquid crystal and the like is used for the optical element, it is possible to drive the variable transmittance element so as to keep a fixed brightness in accordance with the aperture stop information.

The adapter optical system of the present invention includes the optical element that can be inserted in and removed from the optical path and sets the incident inclination angle of the axial beam entering the optical element to a value within a predetermined range. Thus, a change of the imaging position due to insertion and removal of the element is suppressed, and a compact structure can be achieved.

[Embodiment 1]

Figure 2:
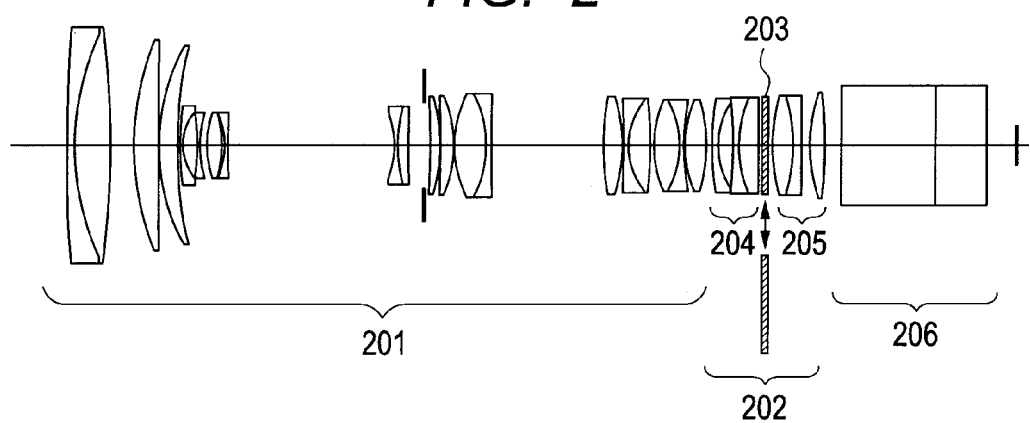
FIG. 2 is an optical cross sectional view of a zoom lens having an adapter optical system of Embodiment 1 of the present invention attached thereto.

FIG. 2 is an optical cross sectional view of an image pickup optical system including an adapter optical system of Embodiment 1 of the present invention. A detachable adapter optical system 202 is attached between a zoom lens 201 as the image pickup lens and a camera optical system 206 in the optical path. The adapter optical system 202 includes, in order from the object side, a first optical unit 204 having negative refractive power, an optical element (second optical unit) 203 that can be inserted in and removed from the optical path, and a third optical unit 205 having positive refractive power. The first optical unit 204 has a first cemented lens constituted by a positive lens and a negative lens, and a camera-body-side surface of the negative lens of the first cemented lens is a concave surface. The third optical unit 205 has a second cemented lens constituted by a positive lens and a negative lens, an image-pickup-lens-side surface of the negative lens of the second cemented lens is a concave surface and the positive lens of the second cemented lens is a biconvex lens. The camera optical system 206 which is contained in a camera body includes an optical characteristic conversion filter such as a color separating optical system, an IR cut filter, or a low pass filter. Here, the incident inclination angle (incident converted inclination angle) of the axial beam entering the second optical unit in this example is 0.05. The optical element 203 of this embodiment is made of a material having a refractive index of 1.6 and has a thickness of 2 mm, and a change of the imaging position due to insertion and removal of the optical element 203 is 2 microns. In this embodiment, an image circle of the image pickup surface has a diameter of 11 mm, and the imaging optical system is attached to the camera having an image sensor of ⅔ inches.

Here, it is supposed that blur of one pixel of high definition television (HDTV) is allowed. A pixel pitch of the image pickup element is approximately 5 microns, and a minimum F-number (maximum aperture) of the zoom lens 201 is 1.85. Therefore, the focal depth is 18.5 microns at minimum. Therefore, a variation amount of the imaging position due to insertion and removal of the optical element 203 is sufficiently smaller than the focal depth, and hence the variation amount of the imaging position due to insertion and removal of the optical element 203 does not become a practical problem. Note that, the adapter optical system in this embodiment satisfies the expressions (1) to (4) as shown in Table 1.

Figure 3:
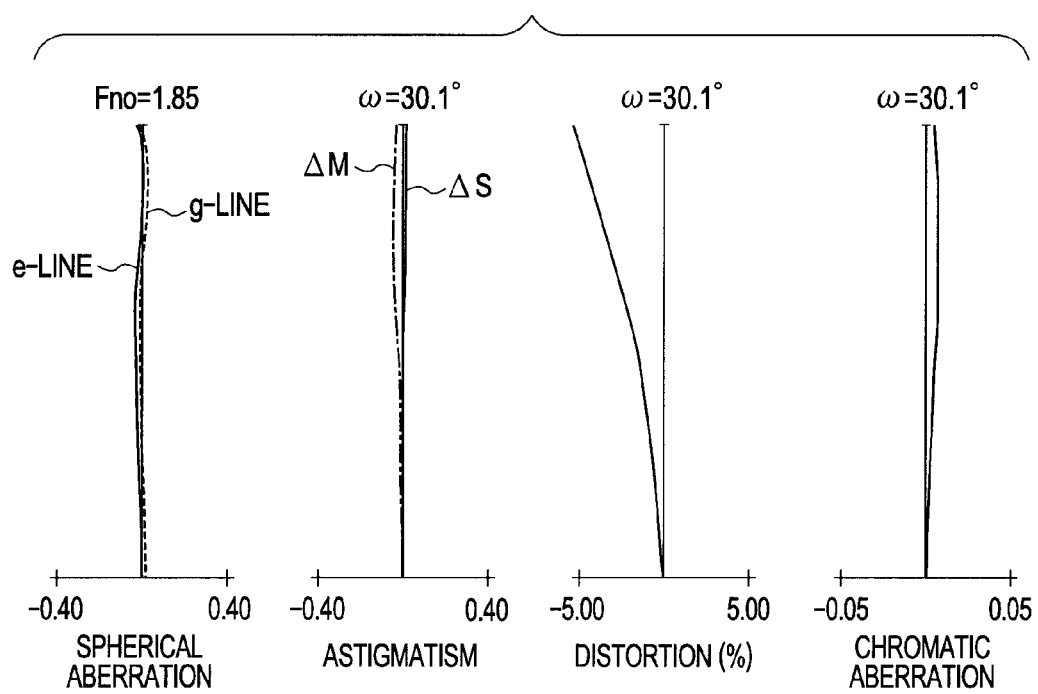
FIG. 3 is a longitudinal aberration diagram at a wide angle end of a zoom lens having the adapter optical system of Embodiment 1 of the present invention attached thereto.
Figure 4A:
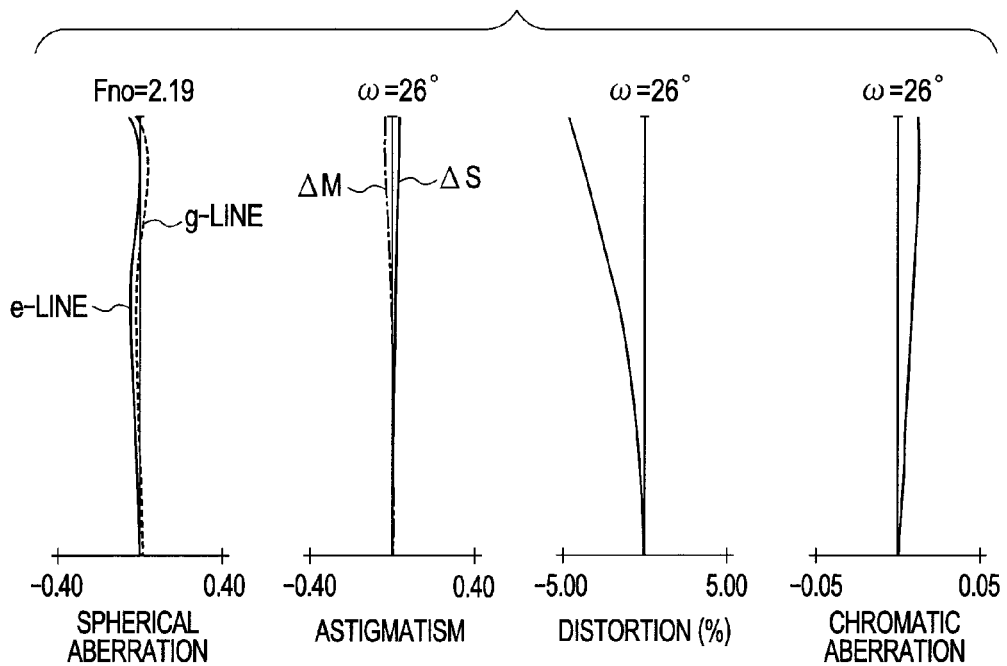
FIG. 4A is a longitudinal aberration diagram at the wide angle end of the zoom lens having the adapter optical system of Embodiment 1 of the present invention attached thereto when the optical element is inserted.
Figure 4B:
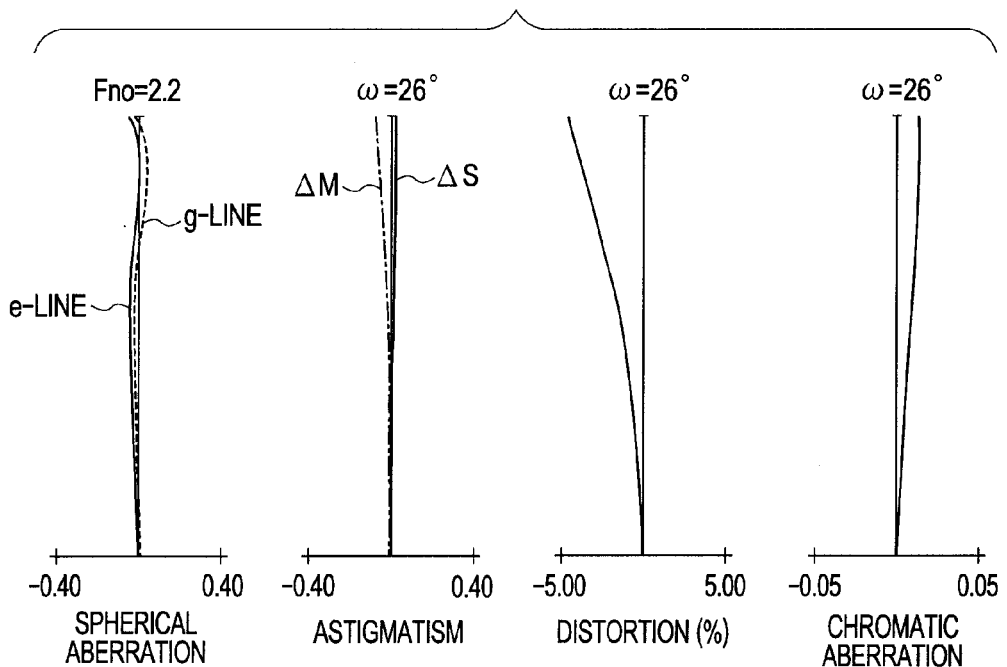
FIG. 4B is a longitudinal aberration diagram at the wide angle end of the zoom lens having the adapter optical system of Embodiment 1 of the present invention attached thereto when the optical element is removed.

FIG. 3 is a longitudinal aberration diagram of the zoom lens 201 at a wide angle end when focusing at infinity. FIG. 4A is a longitudinal aberration diagram at the wide angle end when focusing at infinity in a state in which the adapter optical system 202 is attached to the zoom lens 201, and the optical element 203 is inserted in the optical path. FIG. 4B is a longitudinal aberration diagram at the wide angle end when focusing at infinity in a state in which the adapter optical system 202 is attached to the zoom lens 201 and the optical element 203 is removed from the optical path. It is understood from FIGS. 3 to 4B that an aberration variation when the adapter optical system 202 is attached to the zoom lens 201 is suppressed to be sufficiently small, and substantially no aberration variation is observed due to insertion and removal of the optical element 203.

[Embodiment 2]

Figure 5:
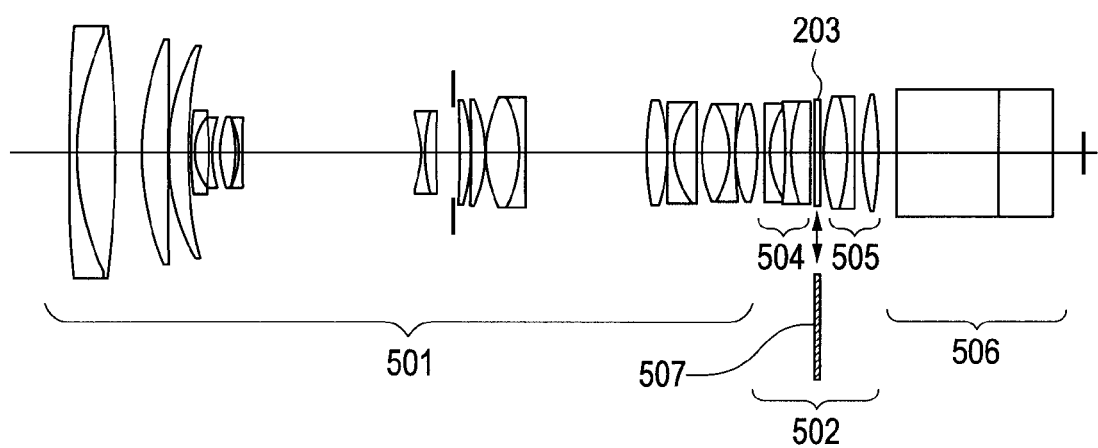
FIG. 5 is an optical cross sectional view of a zoom lens having an adapter optical system of Embodiment 2 of the present invention attached thereto.
Figure 6A:
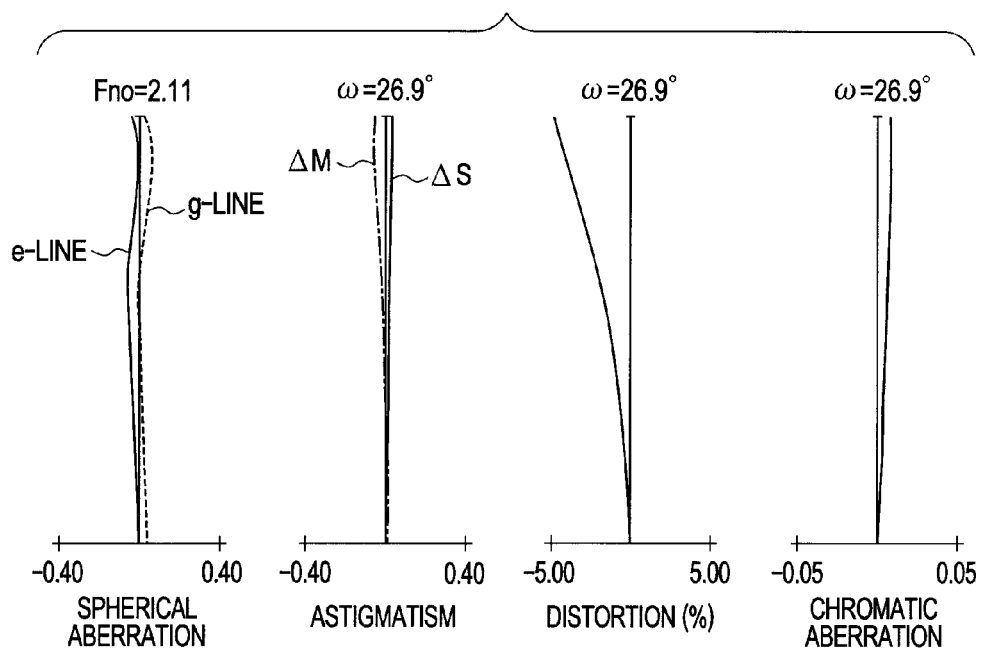
FIG. 6A is a longitudinal aberration diagram at a wide angle end of the zoom lens having the adapter optical system of Embodiment 2 of the present invention attached thereto when an optical element is inserted.
Figure 6B:
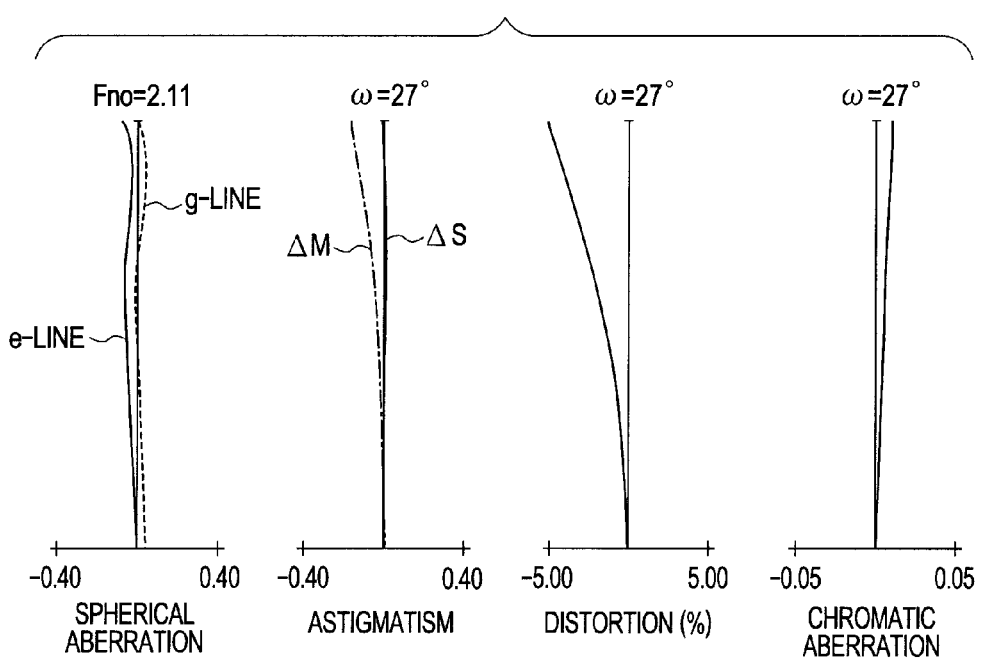
FIG. 6B is a longitudinal aberration diagram at the wide angle end of the zoom lens having the adapter optical system of Embodiment 2 of the present invention attached thereto when the optical element is removed.
Figure 7:
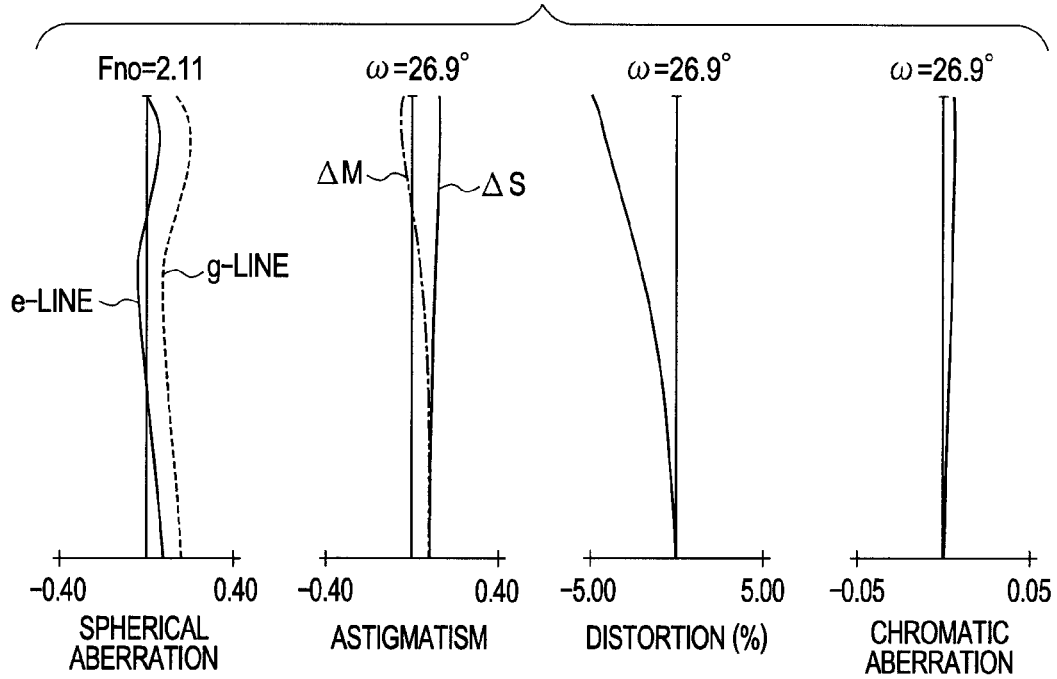
FIG. 7 is an aberration diagram when the optical element of Embodiment 2 is not provided with optical power.

FIG. 5 is an optical cross sectional view of an image pickup optical system including an adapter optical system of Embodiment 2 of the present invention. This embodiment has a similar structure to that of Embodiment 1. The incident inclination angle (incident converted inclination angle) of the axial beam entering an optical element (second optical unit) 503 is −0.23, and further a curvature is given so that positive refractive power is given to an object side surface 507 of the optical element 503. FIG. 6A is a longitudinal aberration diagram at a wide angle end when focusing at infinity in a state in which an adapter optical system 502 is attached to a zoom lens 501 as the image pickup lens, and the optical element 503 is inserted in the optical path. FIG. 6B is a longitudinal aberration diagram at the wide angle end when focusing at infinity in a state in which the adapter optical system 502 is attached to the zoom lens 501, and the optical element 503 is removed from the optical path. FIG. 7 illustrates an aberration diagram when the element is inserted in a case where positive refractive power is not given to the optical element. As understood from FIG. 7, because the incident inclination angle (incident converted inclination angle) of the axial beam entering the optical element is −0.23 which is relatively large, the imaging position is changed by 39 microns due to insertion and removal of the optical element when the curvature is not given. This is a large value for the focal depth of the HDTV standard. However, in this embodiment, the curvature is given to the optical element so as to have refractive power, and hence the change of the imaging position is corrected to be 0 microns. Note that, the adapter optical system of this embodiment satisfies the expressions (1) to (4) as shown in Table 1. Thus, image quality deterioration due to insertion and removal of the element is suppressed, and a compact structure is realized.

Note that, in Embodiment 2, a change of the imaging position due to insertion and removal of the optical element is corrected to 0 microns by giving the refractive power. However, a shift of the imaging position can be intentionally left in consideration of aberration generated by giving the refractive power. In order to cancel a change of the imaging position, positive refractive power is given to the optical element. As an influence, spherical aberration to the under side is generated. Therefore, the best focus position is shifted to the under side. Considering this shift of the best focus position to the under side due to spherical aberration, the refractive power to be given to the optical element is set to be weak in advance. Thus, the imaging surface and the best focus position are matched with each other. Note that, the best focus position as used herein refers to a position where a root-mean-square (RMS) deviation of the spot diameter of the axial beam in the spot diagram becomes smallest.

In addition, in this specification, the surface of the optical element to be inserted and removed to which the curvature is given is regarded as the surface on the object side. However, the same effect can also be obtained by adopting a structure in which the curvature is given to the surface on the image side so that ghost can be easily avoided.

Hereinafter, Numerical Embodiment 1 corresponding to Embodiment 1, and Numerical Embodiment 2 corresponding to Embodiment 2 are described. In the following Numerical Embodiments, with respect to a surface number i from the object side, a curvature radius r, a thickness between a surface i and a surface i+1, a refractive index nd of a medium between the surface i and the surface i+1, an Abbe number vd of the medium between the surface i and the surface i+1 are shown.

(Numerical Embodiment 1)

| | Unit: mm | | | | |
|---|---|---|---|---|---|
| | Surface data | | | | |
| Surface Number | r | d | nd | vd | Effective diameter |
| 1 | 600.261 | 2.20 | 1.75520 | 27.5 | 72.83 |
| 2 | 81.461 | 11.42 | 1.49700 | 81.6 | 69.52 |
| 3 | −290.956 | 7.63 | | | 69.08 |
| 4 | 86.701 | 7.86 | 1.62041 | 60.3 | 65.46 |
| 5 | 3044.710 | 0.15 | | | 64.99 |
| 6 | 66.016 | 6.01 | 1.72916 | 54.7 | 61.52 |
| 7 | 145.708 | (Variable) | | | 60.42 |
| 8 | 111.445 | 0.80 | 1.88300 | 40.8 | 23.69 |
| 9 | 16.812 | 4.65 | | | 20.03 |
| 10 | −47.842 | 0.70 | 1.81600 | 46.6 | 19.80 |
| 11 | 33.779 | 2.24 | | | 19.27 |
| 12 | 28.944 | 5.20 | 1.80518 | 25.4 | 19.72 |
| 13 | −29.192 | 0.54 | | | 19.31 |
| 14 | −24.664 | 0.70 | 1.78800 | 47.4 | 18.93 |
| 15 | 132.572 | (Variable) | | | 18.45 |
| 16 | −28.806 | 0.75 | 1.74320 | 49.3 | 20.25 |
| 17 | 37.218 | 3.81 | 1.84666 | 23.9 | 22.24 |
| 18 | 449.023 | (Variable) | | | 23.13 |
| 19 (Stop) | ∞ | 1.80 | | | 27.20 |
| 20 | −231.233 | 3.33 | 1.67003 | 47.2 | 28.33 |
| 21 | −49.133 | 0.20 | | | 29.14 |
| 22 | −170.365 | 4.05 | 1.51742 | 52.4 | 29.94 |
| 23 | −38.625 | 0.20 | | | 30.51 |
| 24 | 36.315 | 10.16 | 1.48749 | 70.2 | 31.27 |
| 25 | −35.564 | 1.66 | 1.83400 | 37.2 | 30.52 |
| 26 | ∞ | 36.00 | | | 30.51 |
| 27 | 97.385 | 6.35 | 1.50137 | 56.4 | 30.32 |
| 28 | −44.438 | 0.20 | | | 30.04 |
| 29 | −535.653 | 1.40 | 1.83400 | 37.2 | 28.54 |
| 30 | 21.016 | 7.22 | 1.50137 | 56.4 | 26.76 |
| 31 | −424.093 | 1.50 | | | 26.79 |
| 32 | 38.505 | 8.29 | 1.51823 | 58.9 | 26.75 |
| 33 | −27.482 | 1.40 | 1.77250 | 49.6 | 26.50 |
| 34 | 91.360 | 0.30 | | | 26.93 |
| 35 | 38.429 | 6.84 | 1.53172 | 48.8 | 27.63 |
| 36 | −52.407 | 2.00 | | | 27.55 |
| (At time of attaching adapter optical element: at time of inserting optical element) | | | | | |
| 37 | 171.164 | 1.70 | 1.75500 | 52.3 | 28.19 |
| 38 | 26.675 | 5.00 | | | 26.64 |
| 39 | −101.017 | 1.70 | 1.59201 | 67.0 | 26.80 |
| 40 | 43.676 | 6.28 | 1.84666 | 23.8 | 28.18 |
| 41 | −1516.165 | 1.07 | | | 28.72 |
| 42 | ∞ | 2.00 | 1.51633 | 64.1 | 29.00 |
| 43 | ∞ | 1.51 | | | 29.32 |
| 44 | 59.393 | 6.48 | 1.49700 | 81.5 | 30.17 |
| 45 | −56.660 | 2.50 | 1.84666 | 23.8 | 30.13 |
| 46 | 328.114 | 2.81 | | | 30.58 |
| 47 | 50.383 | 5.00 | 1.69680 | 55.5 | 31.86 |
| 48 | −100.474 | 5.00 | | | 31.72 |
| 49 | ∞ | 30.00 | 1.60342 | 38.0 | 36.00 |
| 50 | ∞ | 16.20 | 1.51633 | 64.2 | 36.00 |
| 51 | ∞ | (Variable) | | | 36.00 |
| Image plane | ∞ | | | | |
| (At time of attaching adapter optical element: at time of removing optical element) | | | | | |
| 37 | 171.164 | 1.70 | 1.75500 | 52.3 | 28.20 |
| 38 | 26.675 | 5.00 | | | 26.65 |
| 39 | −101.017 | 1.70 | 1.59201 | 67.0 | 26.81 |
| 40 | 43.676 | 6.28 | 1.84666 | 23.8 | 28.19 |
| 41 | −1516.165 | 1.07 | | | 28.73 |
| 42 | ∞ | 2.00 | | | 29.01 |

-continued

Unit: mm

| | | | | | |
|---|---|---|---|---|---|
| 43 | ∞ | 1.51 | 1.49700 | 81.5 | 29.50 |
| 44 | 59.393 | 6.48 | 1.49700 | 81.5 | 30.35 |
| 45 | −56.660 | 2.50 | 1.84666 | 23.8 | 30.31 |
| 46 | 328.114 | 2.81 | | | 30.76 |
| 47 | 50.383 | 5.00 | 1.69680 | 55.5 | 32.05 |
| 48 | −100.474 | 5.00 | | | 31.91 |
| 49 | ∞ | 30.00 | 1.60342 | 38.0 | 36.00 |
| 50 | ∞ | 16.20 | 1.51633 | 64.2 | 36.00 |
| 51 | ∞ | (Variable) | | | 36.00 |
| Image plane | ∞ | | | | |

Various data (Prior to attachment of adapter optical element)

| | | | | | |
|---|---|---|---|---|---|
| Focal length | 9.50 | 15.20 | 38.86 | 91.49 | 185.25 |
| F-number | 1.85 | 1.85 | 1.85 | 1.85 | 2.85 |
| Angle of field | 30.07 | 19.89 | 8.06 | 3.44 | 1.70 |
| Image height | 5.50 | 5.50 | 5.50 | 5.50 | 5.50 |
| BF | 10.01 | 10.01 | 10.01 | 10.01 | 10.01 |
| Exit pupil position | 241.82 | 241.82 | 241.82 | 241.82 | 241.82 |

(At time of attaching adapter optical element: at time of inserting optical element)

| | | | | | |
|---|---|---|---|---|---|
| Focal length | 11.26 | 18.02 | 46.07 | 108.48 | 219.66 |
| F-number | 2.19 | 2.19 | 2.19 | 2.19 | 3.38 |
| Angle of field | 26.02 | 16.97 | 6.81 | 2.90 | 1.43 |
| Image height | 5.50 | 5.50 | 5.50 | 5.50 | 5.50 |
| BF | 10.01 | 10.01 | 10.01 | 10.01 | 10.01 |
| Exit pupil position | 126.87 | 126.87 | 126.87 | 126.87 | 126.87 |

(At time of attaching adapter optical element: at time of removing optical element)

| | | | | | |
|---|---|---|---|---|---|
| Focal length | 11.27 | 18.04 | 46.10 | 108.56 | 219.82 |
| F-number | 2.20 | 2.19 | 2.19 | 2.19 | 3.38 |
| Angle of field | 26.01 | 16.96 | 6.80 | 2.90 | 1.43 |
| Image height | 5.50 | 5.50 | 5.50 | 5.50 | 5.50 |
| Total lens length | 304.34 | 304.34 | 304.34 | 304.34 | 304.34 |
| BF | 10.008 | 10.008 | 10.008 | 10.008 | 10.008 |
| Exit pupil position | 126.87 | 126.87 | 126.87 | 126.87 | 126.87 |

(Common conditions)

| | | | | | |
|---|---|---|---|---|---|
| Zoom ratio | 19.50 | | | | |
| | | 15.69 | 35.96 | 46.91 | 52.03 |
| d 7 | 0.65 | 2.07 | 13.38 | 3.88 | 6.32 |
| d15 | 53.75 | 36.74 | 13.38 | 3.88 | 6.32 |
| d18 | 5.10 | 7.07 | 10.15 | 8.71 | 1.15 |

(Numerical Embodiment 2)

Unit: mm

Surface data

| Surface Number | r | d | nd | vd | Effective diameter |
|---|---|---|---|---|---|
| 1 | 600.261 | 2.20 | 1.75520 | 27.5 | 72.83 |
| 2 | 81.461 | 11.42 | 1.49700 | 81.6 | 69.52 |
| 3 | −290.956 | 7.63 | | | 69.08 |
| 4 | 86.701 | 7.86 | 1.62041 | 60.3 | 65.46 |
| 5 | 3044.710 | 0.15 | | | 64.99 |
| 6 | 66.016 | 6.01 | 1.72916 | 54.7 | 61.52 |
| 7 | 145.708 | (Variable) | | | 60.42 |
| 8 | 111.445 | 0.80 | 1.88300 | 40.8 | 23.69 |
| 9 | 16.812 | 4.65 | | | 20.03 |
| 10 | −47.842 | 0.70 | 1.81600 | 46.6 | 19.80 |
| 11 | 33.779 | 2.24 | | | 19.27 |
| 12 | 28.944 | 5.20 | 1.80518 | 25.4 | 19.72 |
| 13 | −29.192 | 0.54 | | | 19.31 |
| 14 | −24.664 | 0.70 | 1.78800 | 47.4 | 18.93 |
| 15 | 132.572 | (Variable) | | | 18.45 |
| 16 | −28.806 | 0.75 | 1.74320 | 49.3 | 20.25 |
| 17 | 37.218 | 3.81 | 1.84666 | 23.9 | 22.24 |
| 18 | 449.023 | (Variable) | | | 23.13 |
| 19 (Stop) | ∞ | 1.80 | | | 27.20 |
| 20 | −231.233 | 3.33 | 1.67003 | 47.2 | 28.33 |
| 21 | −49.133 | 0.20 | | | 29.14 |
| 22 | −170.365 | 4.05 | 1.51742 | 52.4 | 29.94 |
| 23 | −38.625 | 0.20 | | | 30.51 |
| 24 | 36.315 | 10.16 | 1.48749 | 70.2 | 31.27 |
| 25 | −35.564 | 1.66 | 1.83400 | 37.2 | 30.52 |
| 26 | ∞ | 36.00 | | | 30.51 |
| 27 | 97.385 | 6.35 | 1.50137 | 56.4 | 30.32 |
| 28 | −44.438 | 0.20 | | | 30.04 |
| 29 | −535.653 | 1.40 | 1.83400 | 37.2 | 28.54 |
| 30 | 21.016 | 7.22 | 1.50137 | 56.4 | 26.76 |
| 31 | −424.093 | 1.50 | | | 26.79 |
| 32 | 38.505 | 8.29 | 1.51823 | 58.9 | 26.75 |
| 33 | −27.482 | 1.40 | 1.77250 | 49.6 | 26.50 |
| 34 | 91.360 | 0.30 | | | 26.93 |
| 35 | 38.429 | 6.84 | 1.53172 | 48.8 | 27.63 |
| 36 | −52.407 | 2.00 | | | 27.55 |

(At time of attaching adapter optical element: at time of inserting optical element)

| | | | | | |
|---|---|---|---|---|---|
| 37 | 279.995 | 1.70 | 1.74100 | 52.6 | 27.57 |
| 38 | 26.131 | 4.70 | | | 26.18 |
| 39 | −94.697 | 1.70 | 1.61800 | 63.3 | 26.28 |
| 40 | 48.432 | 5.80 | 1.80809 | 22.8 | 27.86 |
| 41 | 908.515 | 1.12 | | | 28.75 |
| 42 | 33586.927 | 2.00 | 1.51633 | 64.1 | 29.20 |
| 43 | ∞ | 0.87 | | | 29.79 |
| 44 | 49.781 | 7.19 | 1.59201 | 67.0 | 31.33 |
| 45 | −60.950 | 2.50 | 1.80809 | 22.8 | 31.38 |
| 46 | 2211.863 | 2.75 | | | 31.76 |
| 47 | 60.146 | 4.99 | 1.69680 | 55.5 | 32.56 |
| 48 | −104.500 | 5.00 | | | 32.35 |
| 49 | ∞ | 30.00 | 1.60342 | 38.0 | 36.00 |
| 50 | ∞ | 16.20 | 1.51633 | 64.2 | 36.00 |
| 51 | ∞ | (Variable) | | | 36.00 |
| Image plane | ∞ | | | | |

(At time of attaching adapter optical element: at time of removing optical element)

| | | | | | |
|---|---|---|---|---|---|
| 37 | 279.995 | 1.70 | 1.74100 | 52.6 | 27.57 |
| 38 | 26.131 | 4.70 | | | 26.18 |
| 39 | −94.697 | 1.70 | 1.61800 | 63.3 | 26.28 |
| 40 | 48.432 | 5.80 | 1.80809 | 22.8 | 27.86 |
| 41 | 908.515 | 1.12 | | | 28.75 |
| 42 | ∞ | 2.00 | | | 29.20 |
| 43 | ∞ | 0.87 | | | 29.79 |
| 44 | 49.781 | 7.19 | 1.59201 | 67.0 | 31.33 |
| 45 | −60.950 | 2.50 | 1.80809 | 22.8 | 31.38 |
| 46 | 2211.863 | 2.75 | | | 31.76 |
| 47 | 60.146 | 4.99 | 1.69680 | 55.5 | 32.56 |
| 48 | −104.500 | 5.00 | | | 32.35 |
| 49 | ∞ | 30.00 | 1.60342 | 38.0 | 36.00 |
| 50 | ∞ | 16.20 | 1.51633 | 64.2 | 36.00 |
| 51 | ∞ | (Variable) | | | 36.00 |
| Image plane | ∞ | | | | |

Various data (Prior to attachment of adapter optical element)

| | | | | | |
|---|---|---|---|---|---|
| Focal length | 9.50 | 15.20 | 38.86 | 91.49 | 185.25 |
| F-number | 1.85 | 1.85 | 1.85 | 1.85 | 2.85 |
| Angle of field | 30.07 | 19.89 | 8.06 | 3.44 | 1.70 |
| Image height | 5.50 | 5.50 | 5.50 | 5.50 | 5.50 |
| BF | 10.01 | 10.01 | 10.01 | 10.01 | 10.01 |
| Exit pupil position | 241.82 | 241.82 | 241.82 | 241.82 | 241.82 |

(At time of attaching adapter optical element: at time of inserting optical element)

| | | | | | |
|---|---|---|---|---|---|
| Focal length | 10.73 | 17.17 | 43.90 | 103.36 | 209.29 |
| F-number | 2.09 | 2.09 | 2.09 | 2.09 | 3.22 |
| Angle of field | 27.13 | 17.76 | 7.14 | 3.05 | 1.51 |
| Image height | 5.50 | 5.50 | 5.50 | 5.50 | 5.50 |
| BF | 10.01 | 10.01 | 10.01 | 10.01 | 10.01 |
| Exit pupil position | 105.32 | 105.32 | 105.32 | 105.32 | 105.3 |

-continued

Unit: mm (At time of attaching adapter optical element: at time of removing optical element)

| | | | | | |
|---|---|---|---|---|---|
| Focal length | 10.70 | 17.12 | 43.76 | 103.02 | 208.61 |
| F-number | 2.08 | 2.08 | 2.08 | 2.08 | 3.21 |
| Angle of field | 27.21 | 17.81 | 7.16 | 3.06 | 1.51 |
| Image height | 5.50 | 5.50 | 5.50 | 5.50 | 5.50 |
| BF | 10.01 | 10.01 | 10.01 | 10.01 | 10.01 |
| Exit pupil position | 101.23 | 101.23 | 101.23 | 101.23 | 101.23 |

(Common conditions)

| | | | | | |
|---|---|---|---|---|---|
| Zoom ratio | 19.50 | | | | |
| d 7 | 0.65 | 15.69 | 35.96 | 46.91 | 52.03 |
| d15 | 53.75 | 36.74 | 13.38 | 3.88 | 6.32 |
| d18 | 5.10 | 7.07 | 10.15 | 8.71 | 1.15 |

TABLE 1

| | Expression | Embodiment 1 | Embodiment 2 |
|---|---|---|---|
| $\|\alpha a2\|$ | $0.03 < \|\alpha a2\| < 0.50$ | 0.05 | 0.23 |
| $\|\phi a1/\phi a3\|$ | $1.05 < \|\phi a1/\phi a3\| < 1.35$ | 1.17 | 1.20 |
| $\beta a$ | $1.05 < \beta a < 1.50$ | 1.13 | 1.18 |
| $\|\phi a1/\phi a2\|$ | $\|\phi a1/\phi a2\| > 100$ | | $1.97 \times 10^3$ |
| $\phi a1$ | | $-2.29 \times 10^{-2}$ | $-2.95 \times 10^{-2}$ |
| $\phi a2$ | | | $1.50 \times 10^{-5}$ |
| $\phi a3$ | | $1.96 \times 10^{-2}$ | $2.45 \times 10^{-2}$ |

The adapter optical system has been described above in Embodiments 1 and 2, but the present invention is not limited to the adapter optical system, and the present invention can also be applied to an image pickup lens system and an image pickup apparatus (a camera body). Specifically, the image pickup lens system of the present invention only needs to have a structure including the adapter optical system described above in Embodiment 1 or 2, and an image pickup lens system including an image pickup lens (zoom lens or the like) disposed closer to the subject side (front side) with respect to the adapter optical system. Further, the image pickup apparatus of the present invention only needs to have a structure including the adapter optical system described above in Embodiment 1 or 2, an image pickup lens disposed closer to the subject side with respect to the adapter optical system, and a camera optical system (color separation prism or the like) dispose closer to the image sensor side with respect to the adapter optical system. In other words, the image pickup apparatus of the present invention may be expressed to have a structure including a camera main body including an image sensor (and a color separation prism), an image pickup lens, and the adapter optical system described in Embodiment 1 or 2 disposed therebetween.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-115721, filed May 24, 2011, which is hereby incorporated by reference herein in its entirety.

What is claimed is:

1. An adapter optical system attachable between an image pickup lens and a camera body, the adapter optical system comprising, in order from an object side:

a first optical unit having negative refractive power;
a second optical unit that is insertable in and removable from an optical path; and
a third optical unit having positive refractive power,
wherein the following expression is satisfied:

$$0.03 < |\alpha a2| < 0.50,$$

where $\alpha a2$ represents an incident converted inclination angle obtained by normalizing an incident inclination angle of an axial beam entering the second optical unit inserted in an optical path with an exit inclination angle of an axial paraxial ray emerging from a surface closest to an image plane side in the adapter optical system being set to one (1).

2. An adapter optical system according to claim 1, wherein the following expressions are satisfied:

$$1.05 < |\phi a1/\phi a3| < 1.35; \text{ and}$$

$$1.05 < \beta a < 1.50,$$

where $\phi a1$ represents power of the first optical unit, $\phi a3$ represents power of the third optical unit, and $\beta a$ represents an imaging magnification of an entire adapter optical system.

3. An adapter optical system according to claim 1, wherein the following expression is satisfied:

$$|\phi a1/\phi a2| > 100,$$

where $\phi a1$ represents power of the first optical unit and $\phi a2$ represents power of the second optical unit.

4. An adapter optical system according to claim 1, further comprising an optical characteristic converting element for receiving image pickup condition information defining image pickup conditions from one of the image pickup lens and the camera optical system so as to change optical characteristic depending on the image pickup condition information.

5. An adapter optical system according to claim 1, wherein the camera body has a camera optical system.

6. An adapter optical system according to claim 1, wherein the camera optical system includes a color separating optical system separating a light flux from the image pickup lens into three color light fluxes.

7. An adapter optical system according to claim 1, wherein the first optical unit has a first cemented lens constituted by a positive lens and a negative lens, and wherein a camera-body-side surface of the negative lens of the first cemented lens is a concave surface.

8. An adapter optical system according to claim 1, wherein the third optical unit has a second cemented lens constituted by a positive lens and a negative lens, and wherein an image-pickup-lens-side surface of the negative lens of the second cemented lens is a concave surface.

9. An adapter optical system according to claim 1, wherein the third optical unit has a second cemented lens constituted by a positive lens and a negative lens, and wherein the positive lens of the second cemented lens is a biconvex lens.

10. An image pickup apparatus, comprising:

an image pickup lens;
a camera body including a camera optical system; and
an adapter optical system disposed between the image pickup lens and the camera body,
wherein the adapter optical system is attachable between the image pickup lens and the camera body, the adapter optical system includes, in order from an object side:
a first optical unit having negative refractive power;
a second optical unit that is insertable in and removable from an optical path; and a third optical unit having positive refractive power,
wherein the following expression is satisfied:

$0.03 < |\alpha a2| < 0.50$, where $\alpha a2$ represents an incident converted inclination angle obtained by normalizing an incident inclination angle of an axial beam entering the second optical unit inserted in an optical path with an exit inclination angle of an axial paraxial ray emerging from a surface closest to an image plane side in the adapter optical system being set to one (1).

* * * * *